(12) United States Patent
Kuo et al.

(10) Patent No.: US 8,655,062 B2
(45) Date of Patent: Feb. 18, 2014

(54) IMAGE DECODING METHOD AND IMAGE PROCESSING APPARATUS USING SAME

(75) Inventors: Po-Ting Kuo, Tu-Cheng (TW); Chiao-Ying Wu, Tu-Cheng (TW); Tzu-Yu Lee, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 407 days.

(21) Appl. No.: 13/080,673

(22) Filed: Apr. 6, 2011

(65) Prior Publication Data
US 2012/0189198 A1 Jul. 26, 2012

(30) Foreign Application Priority Data

Jan. 26, 2011 (CN) .......................... 2011 1 0028636

(51) Int. Cl.
*G06K 9/36* (2006.01)
(52) U.S. Cl.
USPC ......................................... 382/166; 382/233
(58) Field of Classification Search
USPC ......... 382/162, 166, 232, 233, 235, 245–246, 382/251; 358/462, 500, 539; 375/240.03
See application file for complete search history.

(56) References Cited

U.S. PATENT DOCUMENTS

| | | | |
|---|---|---|---|
| 5,422,736 A * | 6/1995 | Katayama | 358/462 |
| 6,829,300 B1 * | 12/2004 | Ichioka | 375/240.03 |
| 7,646,817 B2 | 1/2010 | Shen et al. | |
| 2004/0041919 A1 | 3/2004 | Yamanaka | |

* cited by examiner

*Primary Examiner* — Duy M Dang
(74) *Attorney, Agent, or Firm* — Altis Law Group, Inc.

(57) ABSTRACT

An image processing apparatus comprises a central processing unit (CPU) and a graphics processing unit. The CPU comprises a first table specification, a second table specification, an inverse discrete cosine transformation (IDCT) module, a color space converting module and an entropy decoder. The entropy decoder retrieves and processes input image data as a two-dimensional quantized image according to the first table specification. The graphics processing unit performs a dequantizing operation on the input image data according to the second table specification. The IDCT module performs an IDCT operation on the dequantized input image data. The color space converting module performs a color space conversion on the input image data and outputs the converted image data.

4 Claims, 6 Drawing Sheets

IMAGE DECODING METHOD AND IMAGE PROCESSING APPARATUS USING SAME

BACKGROUND

1. Technical Field

The present disclosure relates to graphic processing, and more particularly to an image decoding method and apparatus.

2. Description of Related Art

FIG. 1 is a schematic view of a commonly used image decoding flow for a joint photographic experts group (JPEG) decoder.

As illustrated, a JPEG decoder 10 comprises an entropy decoder 120, a dequantizer 130 and an inverse discrete cosine transformer (IDCT) 140. It should be noted that the JPEG decoder 10 is a discrete cosine transform-based (DCT-based) decoder and JPEG image data is composed of multiple 8×8 pixel arrays.

Input image data 110 is a compressed M×N pixel matrix. When a JPEG image decoding operation is performed, the entropy decoder 120 receives and processes the input image data 110 as two-dimensional (2D) image data (not shown) according to table specification 115. The dequantizer 130 performs a dequantizing operation on the input image data 110 according to a second table specification 125, performing a scalar multiplication on each pixel array involved in a M×N pixel matrix forming the input image data 110.

The inverse discrete cosine transformer 140 performs an IDCT operation on the dequantized input image data. A color space converter 150 performs a color space conversion on the IDCT input image data, and the input image data 110 is correspondingly converted to output image data 160 in RGB format.

When the JPEG decoder 10 is implemented by software modules, a JPEG image decoding module, for example, hardware components in the JPEG image decoding module, are also implemented by software modules and embedded in a central processing unit (CPU). As a result, the CPU may provide a JPEG image processing function via those software modules and implement the described JPEG image decoding flow using the JPEG image decoding module. However, performance of the JPEG image decoding module may be limited by the operational capacity of the CPU.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

An embodiment of the image decoding method and image processing apparatus of the present disclosure uses a GPU, separate from a CPU, to perform dequantization provided by the CPU. Load on the CPU is thus reduced, and there is no need for an extra JPEG decoder.

Figure 1:
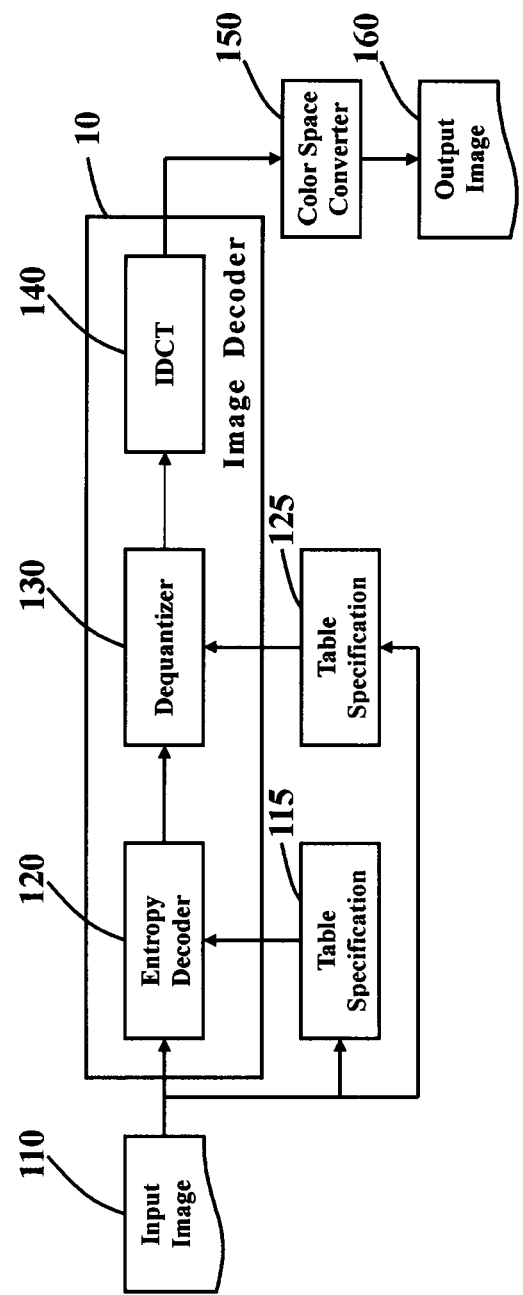
FIG. 1 is a schematic view of a commonly used image decoding flow for a JPEG decoder.
Figure 2:
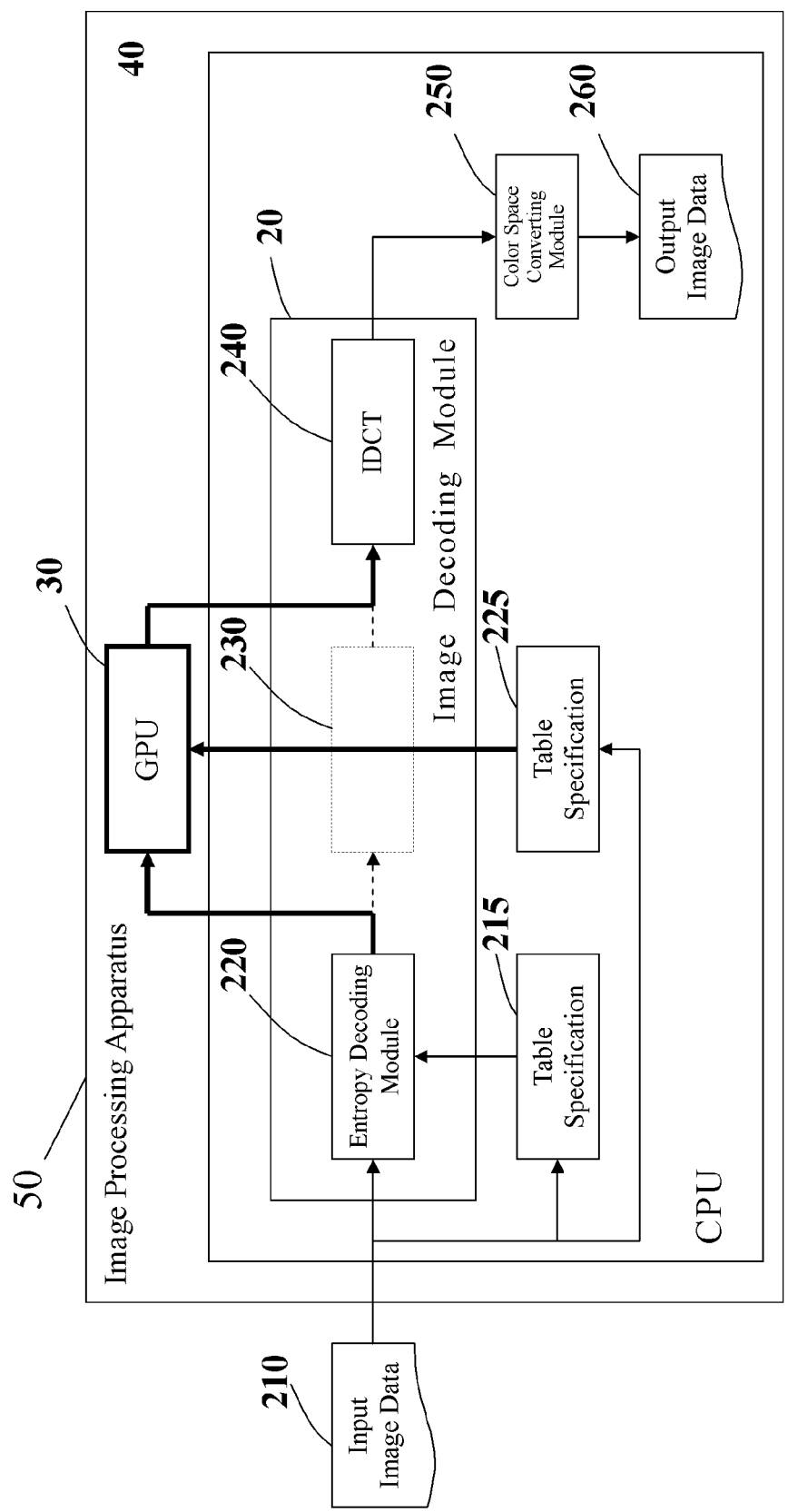
FIG. 2 is a schematic view of an exemplary embodiment of an image processing apparatus in accordance with the present disclosure.

FIG. 2 is a schematic view of an exemplary embodiment of an image processing 50 apparatus in accordance with the present disclosure.

As illustrated, the image processing apparatus 50 comprises a GPU 30 and a CPU 40. The CPU 40 further comprises a JPEG image decoding module 20 and a color space converting module 250. The JPEG image decoding module 20 further comprises an entropy decoder 220, a dequantization module 230 and an inverse discrete cosine transform (IDCT) module 240.

An embodiment of a JPEG image decoding flow uses the GPU 30 of the image processing apparatus 50 to perform a dequantizing operation originally executed by the dequantization module 230 of the CPU 40. The GPU 30 may be a 3D hardware accelerator. It should be noted that JPEG image data is composed of multiple 8×8 pixel arrays.

Input image data 210 is a compressed M×N pixel matrix. When a JPEG image decoding operation is performed, the entropy decoder 220 receives and processes the input image data 210 as 2D image data (not shown) according to a table specification 215. The GPU 30 performs a dequantizing operation on the input image data 210 according to a second table specification 225, performing a scalar multiplication on each pixel array involved in a M×N pixel matrix forming the input image data 210.

The IDCT module 240 performs an IDCT operation on the dequantized input image data 210. The color space converting module 250 performs a color space conversion on the IDCT input image data 210 and, the input image data 210 is correspondingly converted to output image data 260 in RGB format.

It should be noted that an embodiment of the dequantizing operation is implemented by using 3D pipelines, as follows.

Figure 3:
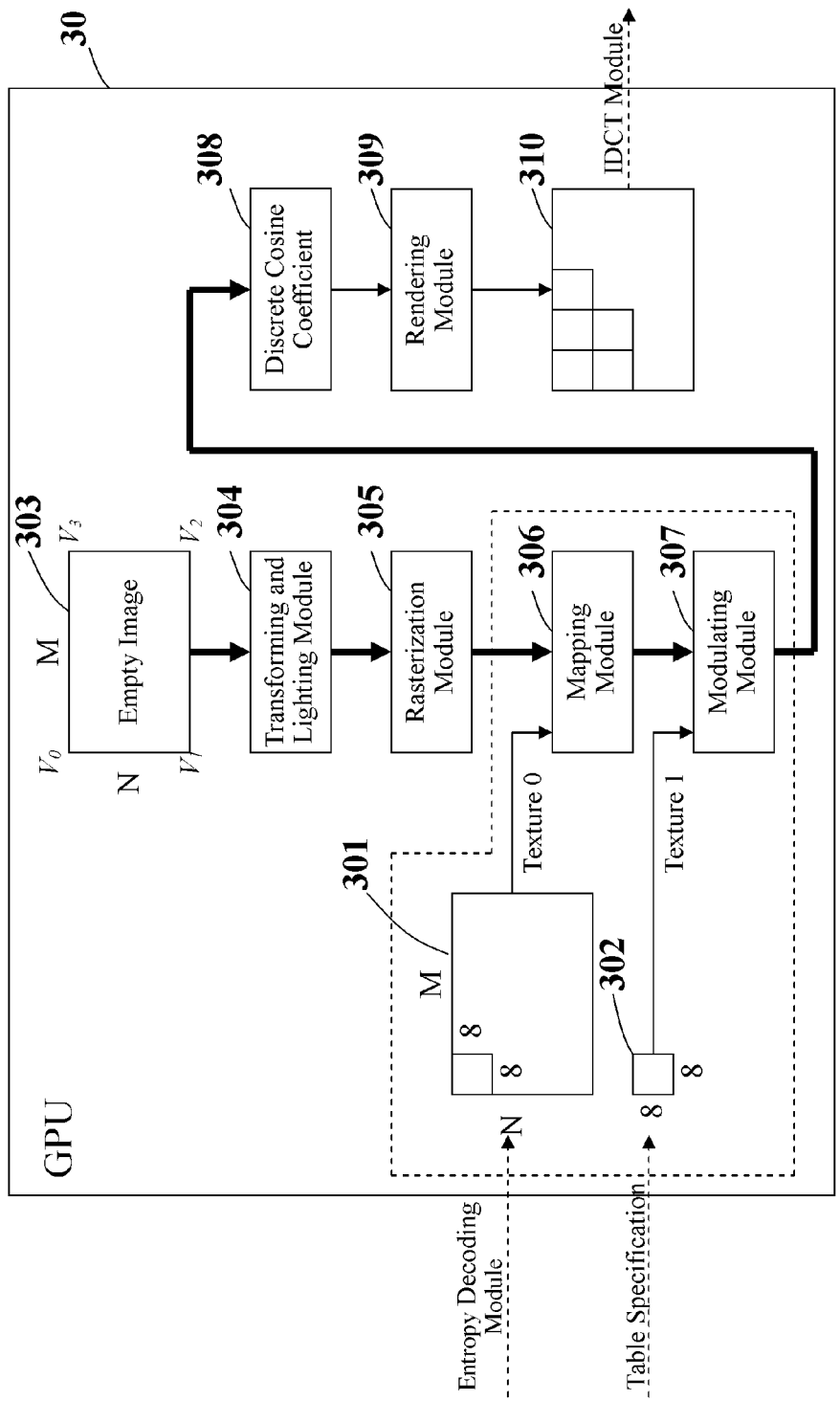
FIG. 3 is a schematic view of an exemplary embodiment of a graphics processing unit (GPU) performing a dequantizing operation in accordance with the present disclosure.

FIG. 3 is a schematic view of an exemplary embodiment of a graphics processing unit performing a dequantizing operation in accordance with the present disclosure.

The GPU 30 comprises a transforming and lighting module 304, a rasterization module 305, a mapping module 306, a modulating module 307 and a rendering module 309.

The GPU 30 retrieves a 2D quantized image 301 (i.e. the input image data 210) from the entropy decoder 220. The 2D quantized image 301 is composed of a M×N pixel matrix, each representing a 8×8 pixel array.

The GPU 30 generates an empty image 303 with a size of a M×N pixel matrix. An image range of the M×N pixel matrix is displayed by four vertices, comprising $V_0$, $V_1$, $V_2$ and $V_3$. The transforming and lighting module 304 performs a transforming and lighting operation on the empty image 303. The rasterization module 305 performs a rasterizing operation on the empty image 303. The mapping module 306 performs a mapping operation on the 2D quantized image 301 and the empty image 303 so that the 2D quantized image 301 is mapped to the image range of the empty image 303.

Figure 4:
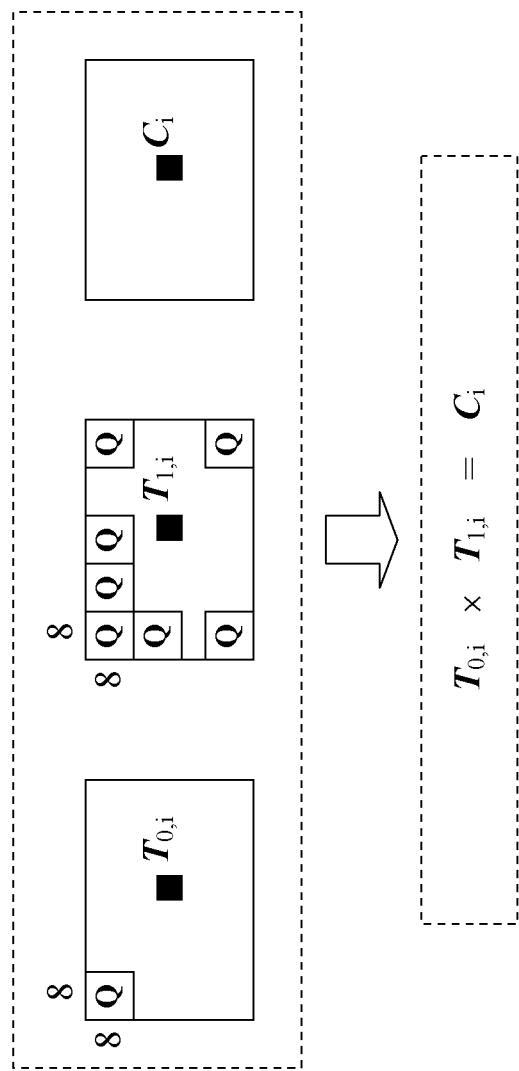
FIG. 4 is a schematic view of an exemplary embodiment of a scalar multiplication in accordance with the present disclosure.

The 2D quantized image 301 is image data formed by "texture 0" while a table quantized image 302 is image data formed by "texture 1". The modulating module 307 performs a modulating operation on the 2D quantized image 301 and the table quantized image 302, the image multiplication mixing texture data of the two images, as shown in FIG. 4.

Dimensions of the 2D quantized image 301 often exceed those of the table quantized image 302, so that, before modulation, texture wrapping of the table quantized image 302 must be set to a repeat mode to expand image data formed by texture 1. Accordingly, the image data dimensions of the table quantized image 302 are identical to those of the 2D quantized image 301, an M×N pixel matrix.

In the disclosed modulating operation, scalar multiplication performed on the 2D quantized image 301 and the table quantized image 302 ($T_{0,i} \times T_{1,i} = C_i$) generates a discrete cosine coefficient 308 ($C_i$) for the input image data 210, using a multi-texture mapping method.

The rendering module 309 renders the 2D quantized image 301 to a frame buffer object (FBO) according to the discrete cosine coefficient $C_i$, using a "Render to Texture" technology, for generating a dequantized image 310. The CPU performs an IDCT operation on the dequantized image 310 for obtaining a digital image in RGB format (the output image data 260) corresponding to the input image data 210.

Figure 5:
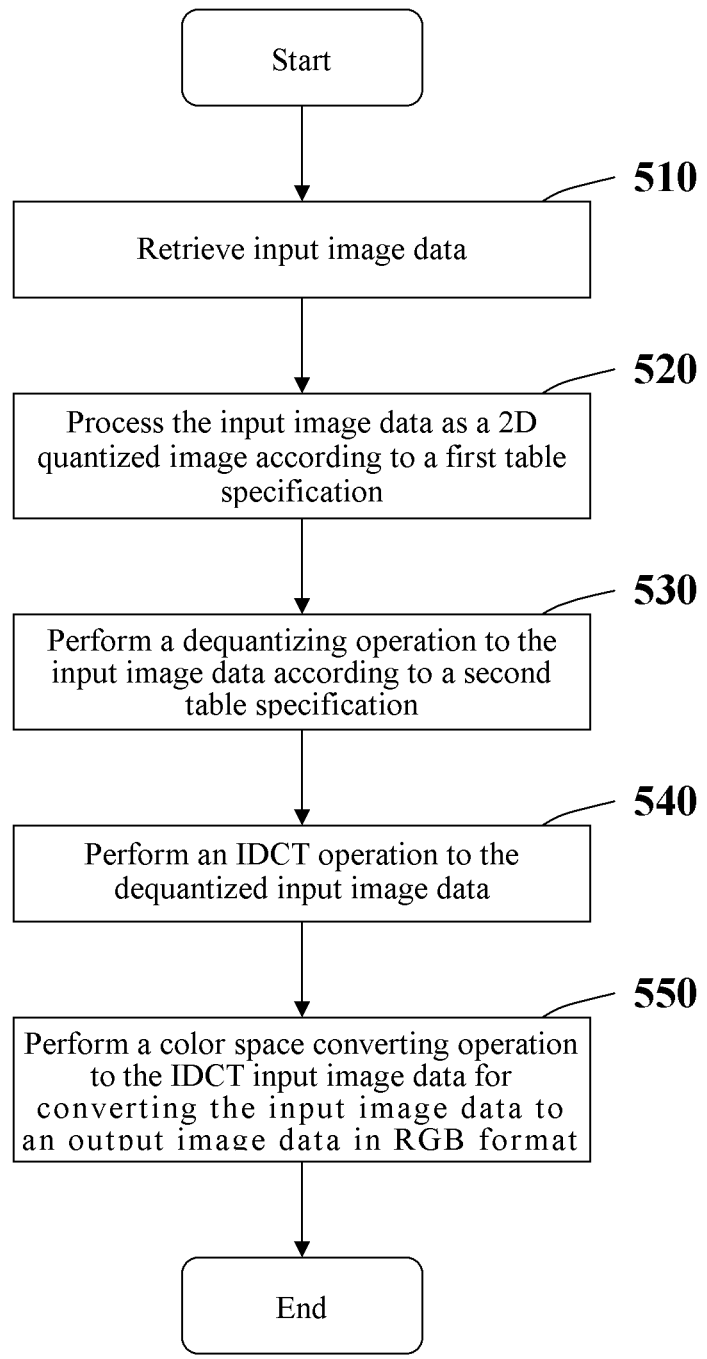
FIG. 5 is a flowchart of an exemplary embodiment of a JPEG image decoding method in accordance with the present disclosure.

FIG. 5 is a flowchart of an exemplary embodiment of a JPEG image decoding method in accordance with the present disclosure.

Referring to FIG. 2, the input image data 210 is retrieved using the CPU 40 (step S510). The input image data 210 is a compressed M×N pixel matrix. The input image data 210 is processed as a 2D quantized image according to the first table specification 215 using the entropy decoder 220 (step S520).

Input image data 210 is dequantized according to the second table specification 225 using the GPU separate from the CPU 40 (step S530), Scalar multiplication is performed on each pixel array involved in a M×N pixel matrix forming the input image data 210.

An IDCT operation is performed on the dequantized input image data 210 using the IDCT module 240 of the CPU 40 (step S540). A color space conversion is performed on the IDCT input image data 210 using the color space converting module 250 of the CPU 40, thereby converting the input image data 210 to the output image data 260 in RGB format (step S550).

Figure 6:
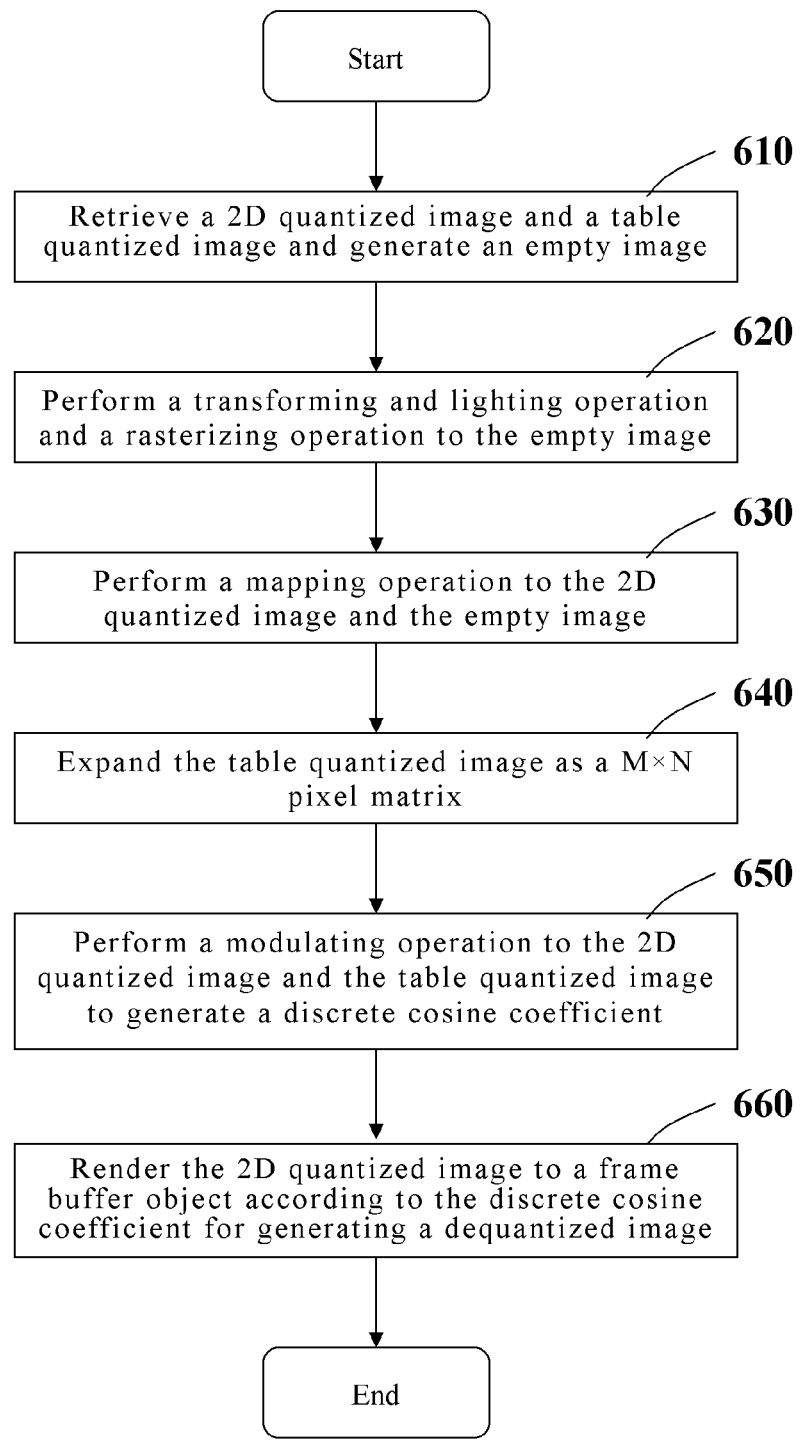
FIG. 6 is a flowchart of an exemplary embodiment of a dequantizing operation in accordance with the present disclosure.

FIG. 6 is a flowchart of an exemplary embodiment of a dequantizing operation in accordance with the present disclosure.

Referring to FIGS. 3 and 5, the 2D quantized image 301 is retrieved from the entropy decoder 220, the table quantized image 302 is retrieved from the second table specification 225, and the empty image is generated (step S610). The empty image 303 is composed of a M×N pixel matrix. An image range of the M×N pixel matrix is displayed by four vertices, comprising $V_0$, $V_1$, $V_2$ and $V_3$. A transforming and lighting operation and a rasterizing operation are performed on the empty image 303 (step S620). A mapping operation is performed on the 2D quantized image 301 and the empty image 303 (step S630), so that the 2D quantized image 301 is mapped to the image range of the empty image 303.

Texture wrapping of the table quantized image 302 (texture 1) is set to a repeat mode to expand the table quantized image 302 as a M×N pixel matrix (step S640). A modulating operation is performed on the 2D quantized image 301 and the table quantized image 302 to generate a discrete cosine coefficient 308 (step S650), as shown in FIG. 4. The 2D quantized image is rendered to a frame buffer object according to the discrete cosine coefficient 308 for generating the dequantized image 310 (step S660).

An embodiment of the image decoding method and image processing apparatus of the present disclosure implements a dequantizing operation via 3D fixed-function pipelines and multi-texture mapping provided by a 3D hardware accelerator.

An embodiment of the JPEG image decoding method is not limited by operational capacity of the CPU 40, operational loading of which can be shared during JPEG image decoding, thereby achieving parallel processing. Thus, system performance is optimized with no increase in hardware costs.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An image decoding method of an image processing apparatus comprising a central processing unit (CPU) and a graphics processing unit, wherein the CPU comprises an entropy decoder, an inverse discrete cosine transformation (IDCT) module, a color space converting module, a first table specification and a second table specification, the method comprising:

retrieving input image data using the CPU;

processing the input image data as a two-dimensional quantized image according to the first table specification using the entropy decoder;

performing a dequantizing operation on the input image data according to the second table specification using the graphics processing unit, wherein the dequantizing operation performed by the graphics processing unit comprises:

retrieving the two-dimensional quantized image from the entropy decoder;

retrieving a table quantized image from the second table specification;

generating an empty image;

performing a transforming and lighting operation and a rasterizing operation on the empty image;

performing a mapping operation on the two-dimensional quantized image and the empty image;

setting texture wrapping of the table quantized image to a repeat mode so as to expand the table quantized image as an M×N pixel matrix;

performing a modulating operation on the two-dimensional quantized image and the table quantized image to generate a discrete cosine coefficient; and rendering the two-dimensional quantized image to a frame buffer object according to the discrete cosine coefficient for generating the dequantized input image data;

performing an IDCT operation on the dequantized input image data using the IDCT module; and performing a color space conversion on the IDCT input image data and outputting the converted image data using the color space converting module.

2. The image decoding method as claimed in claim 1, wherein the mapping operation further comprises mapping the two-dimensional quantized image to the empty image.

3. An image processing apparatus, comprising:
- a CPU, comprising a first table specification, a second table specification, an inverse discrete cosine transformation (IDCT) module, a color space converting module and an entropy decoder, wherein the entropy decoder retrieves and processes input image data as a two-dimensional quantized image according to the first table specification; and
- a graphics processing unit, performing a dequantizing operation on the input image data according to the second table specification;
  - wherein the dequantizing operation performed by the graphics processing unit comprises:
    - retrieving the two-dimensional quantized image from the entropy decoder;
    - retrieving a table quantized image from the second table specification; and
    - automatically generating an empty image; and
  - the graphics processing unit comprises:
    - a transforming and lighting module to perform a transforming and lighting operation on the empty image;
    - a rasterization module to perform a rasterizing operation on the empty image;
    - a mapping module to perform a mapping operation on the two-dimensional quantized image and the empty image, and to set texture wrapping of the table quantized image to a repeat mode so as to expand the table quantized image as an M×N pixel matrix;
    - a modulating module to perform a modulating operation on the two-dimensional quantized image and the table quantized image to generate a discrete cosine coefficient; and
    - a rendering module to render the two-dimensional quantized image to a frame buffer object according to the discrete cosine coefficient for generating the dequantized input image data;
  - wherein the IDCT module performs an IDCT operation on the dequantized input image data and the color space converting module performs a color space conversion on the IDCTed input image data and outputs the converted image data.

4. The image processing apparatus as claimed in claim 3, wherein the mapping module further maps the two-dimensional quantized image to the empty image.

* * * * *